United States Patent [19]
Yamaguchi

[11] Patent Number: 4,509,613
[45] Date of Patent: Apr. 9, 1985

[54] MOTORCYCLE AIR CLEANER ARRANGEMENT

[75] Inventor: Ken Yamaguchi, Saitama, Japan

[73] Assignee: Honda Giken Kogyo Kabushiki Kaisha, Tokyo, Japan

[21] Appl. No.: 419,295

[22] Filed: Sep. 17, 1982

[30] Foreign Application Priority Data

Sep. 19, 1981 [JP] Japan .................................. 56-148251

[51] Int. Cl.³ ............................................. B62D 61/02
[52] U.S. Cl. .................................... 180/219; 55/385 B
[58] Field of Search ............. 180/219, 215; 55/385 B; 280/281 R, 12.11, 12.12, 12.13, 12.14

[56] References Cited

U.S. PATENT DOCUMENTS

| 2,952,327 | 9/1960 | Farr ................................. 55/385 B |
| 4,157,902 | 6/1979 | Tokar .............................. 55/385 B |
| 4,212,659 | 7/1980 | Magrini .......................... 55/585 B |
| 4,364,340 | 12/1982 | Kimura ............................. 180/219 |
| 4,427,087 | 1/1984 | Inoue et al. ..................... 180/219 |

Primary Examiner—Joseph F. Peters, Jr.
Assistant Examiner—Kenneth R. Rice
Attorney, Agent, or Firm—Sughrue, Mion, Zinn, Macpeak & Seas

[57] ABSTRACT

A motorcycle is provided with an air cleaner mounted beneath the tank and between downwardly extending portions thereof, between the frame members. The air cleaner is provided with a window for viewing the element and is inspected by pivotting the tank upwardly.

11 Claims, 11 Drawing Figures

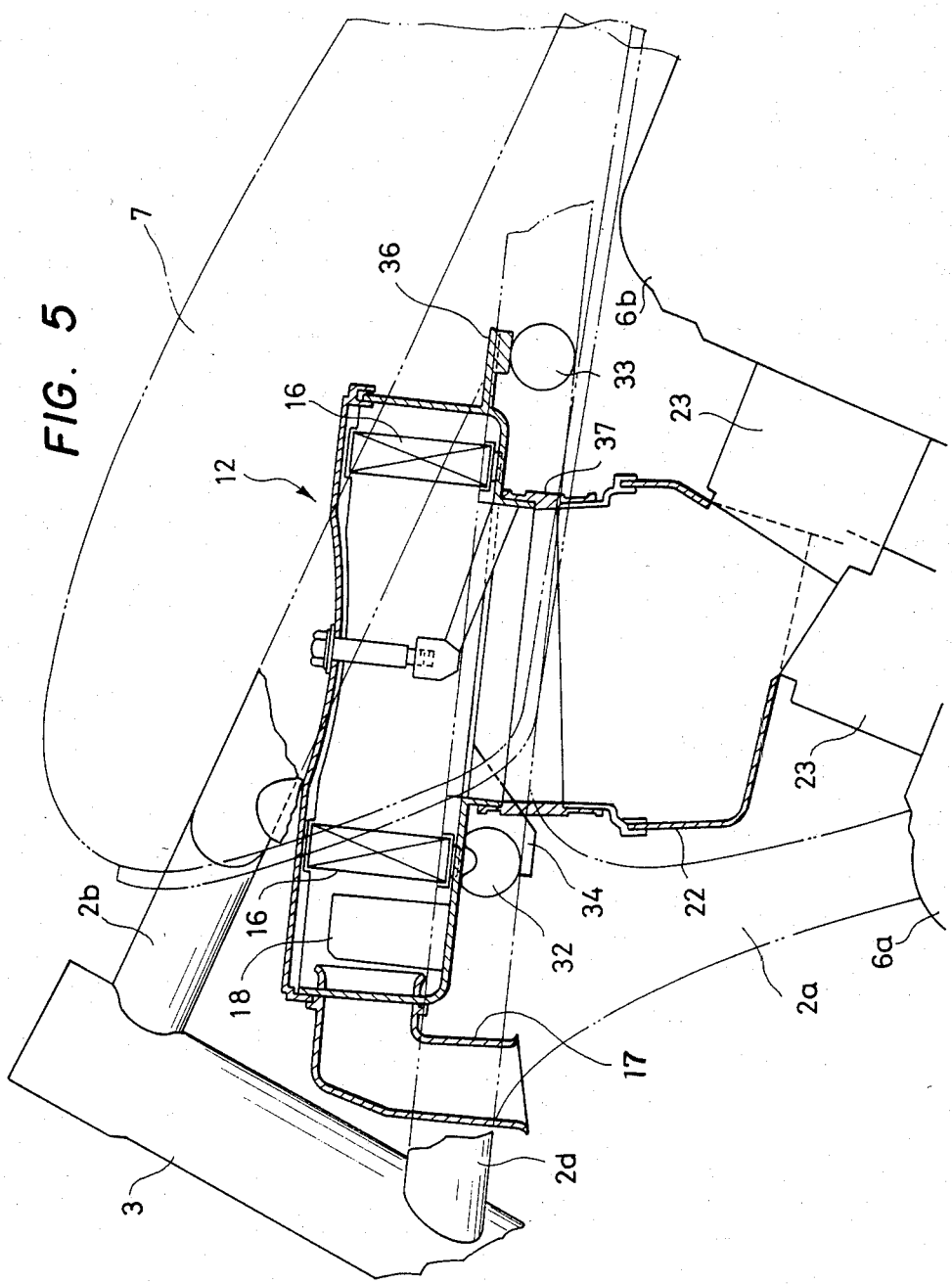

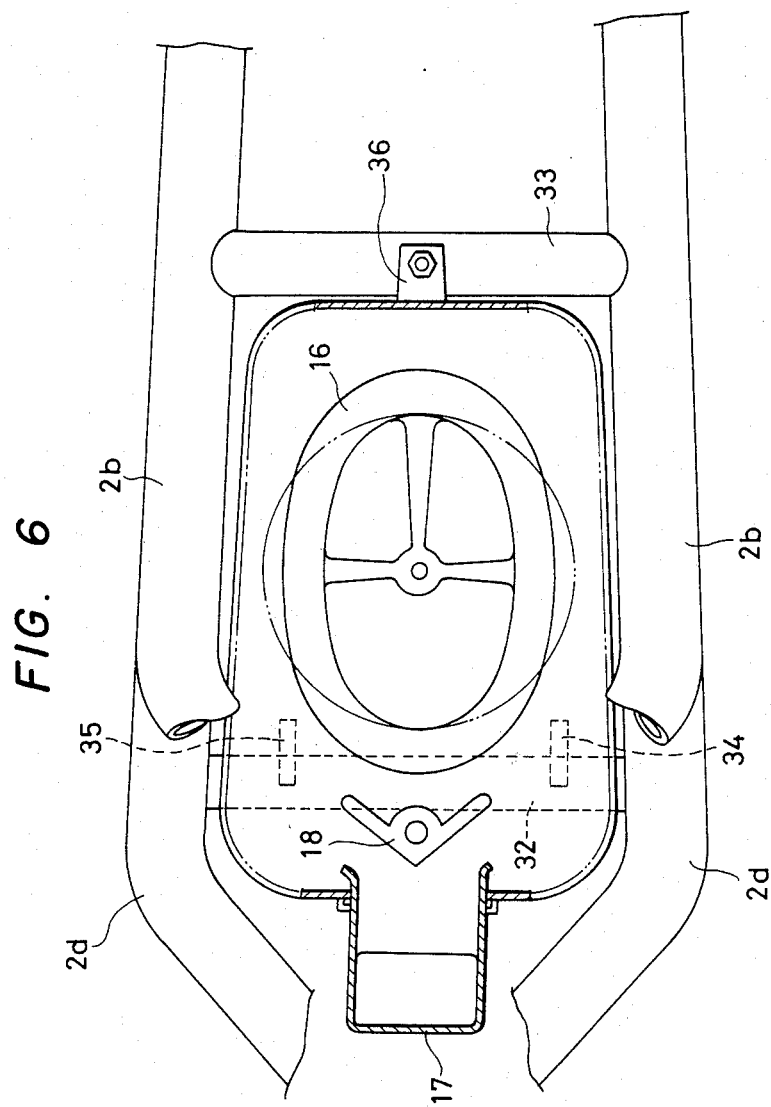

MOTORCYCLE AIR CLEANER ARRANGEMENT

BACKGROUND OF THE INVENTION

The present invention relates to a motorcycle, and in particular, to the arrangement of an air cleaner on a motorcycle.

In the case of a motorcycle which carries what is called a "V-array engine" in which the cylinders are mounted in a V-array, it is difficult to arrange the intake system. In accordance with the prior art, it was usually the case that the air cleaner was provided in such a way as to transversely project from the body of the motorcycle, but it is not preferable to do so because the appearance thereof is not good. The impression is given that the bike is wide, the slimness of the body of the motorcycle is spoiled and the feet of the rider strike against the air cleaner. In addition, since an intake system is required for each of the cylinders, there is also a drawback in that the cost becomes high.

In accordance with the prior art, there is known a construction such that three or four fastening stays extend from the frame body and the air cleaner is mounted thereon. However, since the number of parts increases with such a mounting arrangement, and the constitution thereof is complex, the assembly operation is not efficient and the cost becomes high.

Since there are also various conditions on the intake air in the system, it is in particularly difficult to arrange the suction port of the air cleaner.

For example, the conditions on the intake air of the air cleaner are as follows:

1. If the temperature of the intake air is high, the air density is low. Thus, since it becomes impossible to obtain high power output, it is required that the temperature of the intake air be lowered.
2. A turbulent flow is caused, for example, when the moving motorcycle travels against the wind, thereby making it impossible to draw in the air at a constant pressure. As a result, it becomes impossible for the carburetor to be set. Therefore, it is required that there be no variance in the pressure of the air in the suction port.
3. It goes without saying that it is required that no water be admitted with the intake air.

In the case of an air cleaner provided with an elliptic filter element, the intake air passes by only one portion of the element because the suction duct is close to the element. As a consequence, it is impossible to use the whole element and there is caused an inconvenience, for example, in that the life of the element becomes short as the air resistance increases.

Not only the case, but also the cover are made of non-transparent materials in the conventional air cleaner. On the other hand, when the filter element has become dirty, it is required to replace it with another one. In the past, the cover was removed to inspect the interior portion of the air cleaner to confirm whether the element was dirty or not, and this operation is troublesome.

SUMMARY OF THE INVENTION

The object of the present invention is to provide a motorcycle in accordance with which there is arranged an air cleaner in a dead space so as to make it possible to maintain the slim appearance of the body thereof, lower the cost and improve the assembly operation.

Another object of the invention is to provide such motorcycle wherein the air cleaner is disposed at a front portion of a bottom wall of a fuel tank, so that an outer wall of the tank is disposed spaced away from the bottom wall, whereby smooth fuel flow results.

The motorcycle in accordance with the present invention is constituted in such a way that there is provided an air cleaner in a space portion (a dead space) which is surrounded by a head pipe, a pair of upper main pipes which are connected to the head pipe and carry a fuel tank, and a pair of lower main pipes which are connected to the head pipe and the pair of upper main pipes.

In addition, there is provided a mounting for an air cleaner which makes it possible to lower the cost and improve the assembly operation by utilizing a frame pipe as a stay for mounting the air cleaner. That is, there are utilized a pair of cross-pipes which are mounted onto the pair of lower main pipes with a predetermined distance therebetween as mounting stays, and there are provided a hook member which engages one of the pair of cross-pipes and a fixing portion which is fixed to the other of the pair of cross-pipes by a fixing means on the air cleaner. The air cleaner in accordance with this invention is constructed in such a way that there is provided a rectifying member between the suction port and the element so that the intake air is branched by this rectifying member so that the element is effectively utilized as a whole.

Furthermore, one embodiment in accordance with this invention is constituted such that the suction port of the air cleaner is provided at the side of the head pipe so as to be directed downwards. In addition, there is provided an air cleaner in which a transparent portion is provided in at least one portion of the case or a cover which comprises the air cleaner case, the cover and a filter element which is provided in the case in accordance with the present invention such that the element which is provided therein can be viewed from the outside through the transparent portion, making it possible to confirm whether the element is dirty without removing the cover.

BRIEF DESCRIPTION OF THE DRAWINGS

FIG. 5 is a side elevation in cross section showing the portion of the air cleaner of FIG. 3.

FIG. 6 is a plan view inclusive of a partial cross section thereof;

DETAILED DESCRIPTION OF THE PREFERRED EMBODIMENTS

Figure 1:
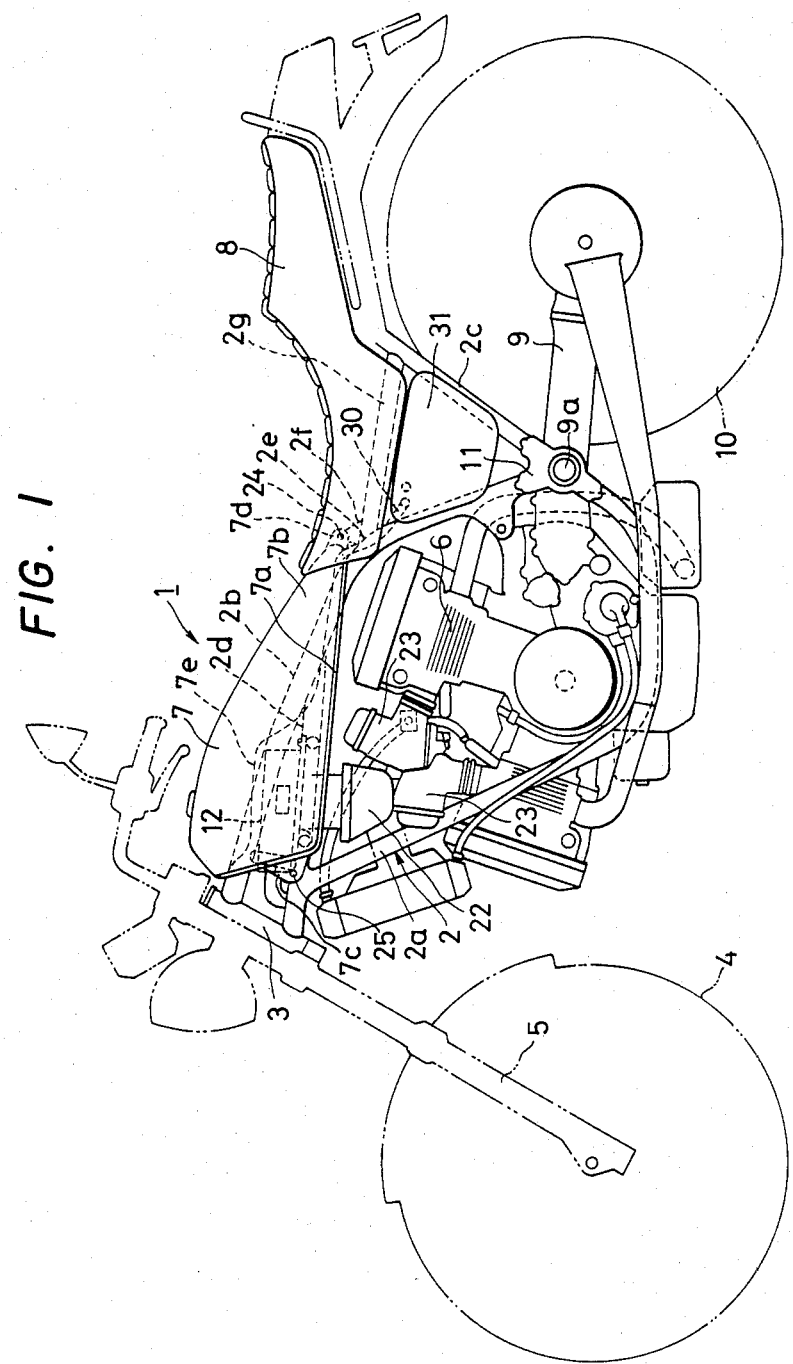
FIG. 1 is a schematic side elevation of a motorcycle.
Figure 2:
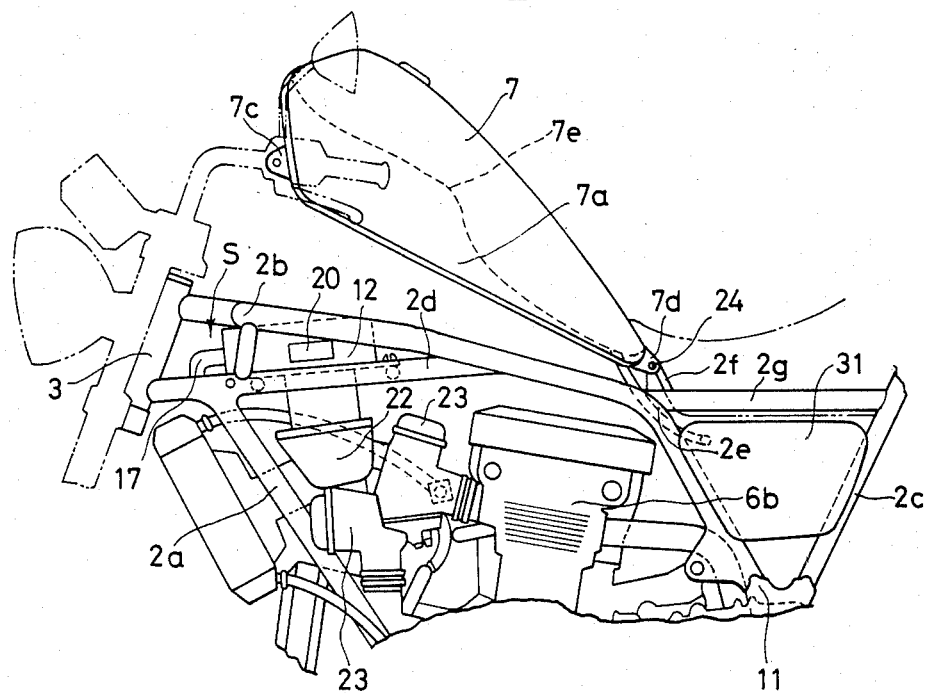
FIG. 2 is a view similar to FIG. 1 in which the fuel tank is lifted.
Figure 3:
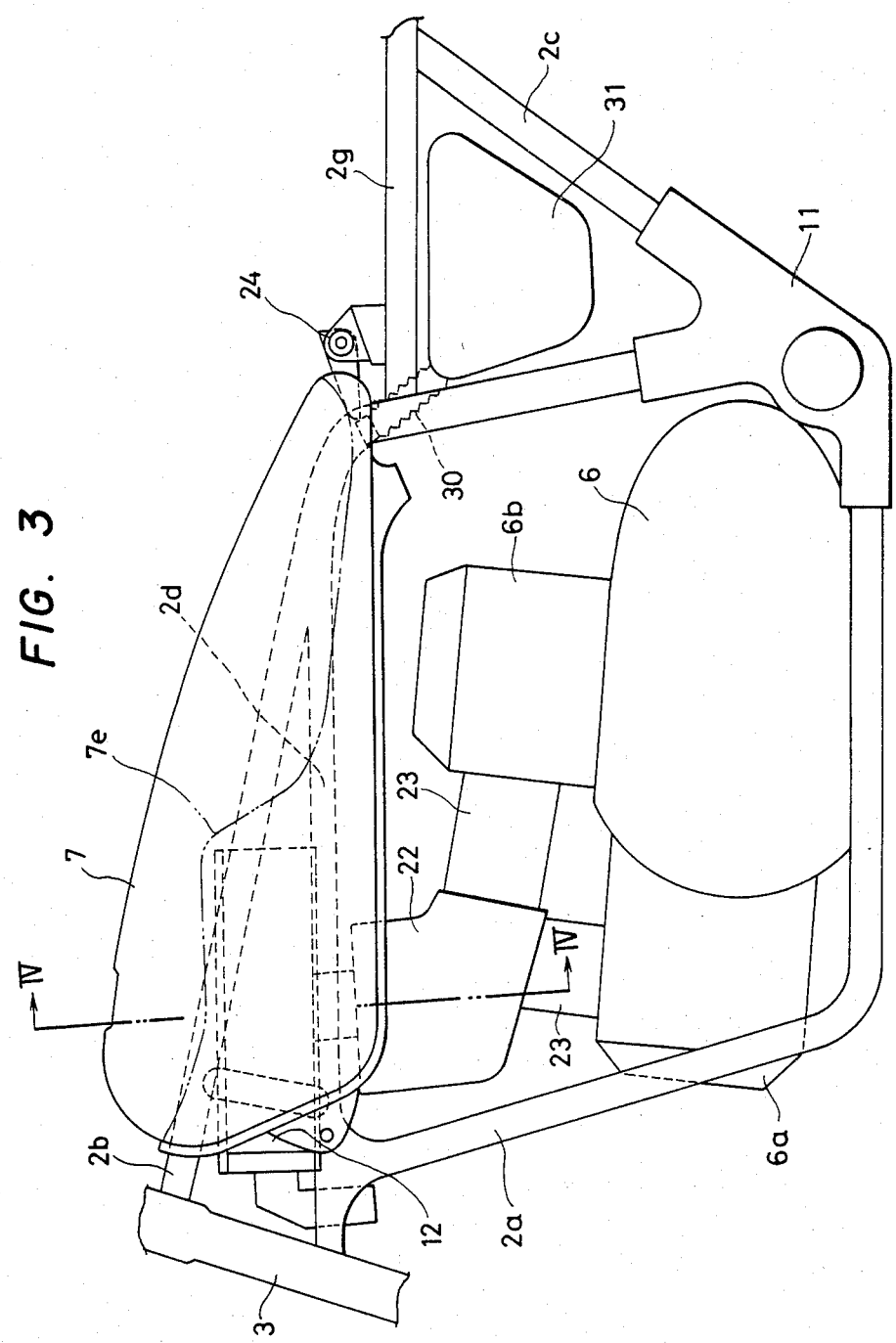
FIG. 3 is a schematic side elevation showing the motor of the motorcycle in accordance with the present invention.

FIGS. 1 through 3 are schematic side elevational views of a motorcycle. In this motorcycle 1, there is supported a front fork 5, which supports a front wheel 4 in such a way as to be able to control the direction thereof, on a head tube 3 at the front end of the frame 2 in a well-known manner. There is mounted an engine 6 at the lower portion of a tube 2a of the frame which extends downwards from the head tube 3. There is mounted a fuel tank 7 above the engine 6. A seat 8 is provided in such a way as to extend backwards from the fuel tank 7. A rear fork 9 which supports a rear wheel 10 is pivotably fixed to the lower rear portion of the frame in such a way as to extend rearwardly therefrom. This embodiment is of the shaft drive type, and the engine is of a water-cooled type in which the crank shaft is transversely arranged, and is of the V-type, viewing from a side of the motorcycle.

The construction of the frame 2 is as discussed below. That is, the frame 2 is provided with upper members (upper mainpipes) 2b which are gently downwardly inclined from the upper portion of the head tube 3 so as to extend obliquely downwardly and bend towards the rear from the rear end of the fuel tank 7. The front ends of the two (left and righ) members 2b are joined to the back surface at the upper portion of the head tube 3. The members 2b extend rearwardly from the head tube 3 in such a way as to expand to the right and to the left respectively and obliquely downwardly towards the rear. The lower ends of the right and left members 2b are joined to the ends of the tubes 2a and further to the lower ends of the rear members 2c which are provided in such a way as to extend obliquely upwardly towards the rear. There are provided brackets 11 at the crossing portion of these members. 2g designates a seat rail positioned below the seat 8 to support the same. The base portions of the rear fork 9 which will be mentioned again later are pivotably fixed (9a) to these brackets in such a way as to enable a swinging motion.

In addition, there are provided right and left lower members 2d (lower main pipes) at the back surface of the lower portion of the head tube 3 in such a way as to extend to the rear. These members are substantially linear. The front ends thereof are joined to the back surface of the lower portion of the head tube 3. They are provided in such a way as to be in parallel with the front portions of the right and left upper members 2b below the front portions thereof and expand to the right and to the left towards the rear. The rear ends thereof are joined at a position which is short of the bending portion 2e of the upper members 2b.

Hence, there is provided a space (S) (FIG. 2) which extends upwardly and downwardly and which is opened to the right and to the left between the right and left upper members 2b and lower members 2d at the back of the head tube. There is provided the above mentioned fuel tank 7 above the upper members 2b. The tank 7 is of a straddle type. The side portions 7a thereof are positioned outside the upper members 2b and the lower members 2d so as to cover the same. A bottom wall 7e of the tank 7 has a front portion formed with a recess recessed upwardly, so that the air cleaner 12 is accommodated within the recess. The tank 7 is pivotably mounted to the bending portion 2e by means of a pin 24 at a bracket 7d which is provided at the rear portion 7b as well as a bracket 2f at the frame side. The front portion of the tank is fixed to the upper front portion of the frame via bracket 7c by means of a lock bolt 25. If the lock bolt 25 is released, the tank 7 is lifted upwards in such a way as to swing with the pin 24 at the rear portion as the support point. This is shown in FIG. 2. That is, the tank is provided in such a way as to be swung upwardly with the rear end of the tank 7 as the support point. In this embodiment, the seat 8 is detachable with respect to the frame 2. The seat is provided in such a way as to extend rearwardly so that the front end thereof is in engagement with the rear end of the tank 7. The above mentioned engine 6 is arranged below the fuel tank 7.

FIG. 3 is a schematic side elevational view showing the engine of the motorcycle in accordance with the present invention. At reference numeral 3 is the head tube, 2b is the pair of right and left upper members, 2d is the pair of right and left lower members, 2g is the seat rail positioned below the seat 8 to support the latter, and 2c is the pair of right and left rear pipes. These pipes constitute the framework of the body of the motorcycle. The tubes 2a are rectangular. Both ends thereof are coupled to the rear members 2c by means of brackets 11. There is mounted an engine 6 of the V-type in which there are arrayed cylinders 6a, 6b in a V-array at the lower portion of the tube 2a. 23, 23 are carburetors for supplying air-fuel mixtures to the cylinders 6a, 6b respectively. They are connected to a resonance chamber (expansion chamber) 22. 12 is an air cleaner for supplying air to the resonance chamber 22. The air cleaner 12 is arranged in the space surrounded by the head pipe 3, the pair of right and left main pipes 2b and the pair of right and left lower main pipes 2d.

Figure 4:
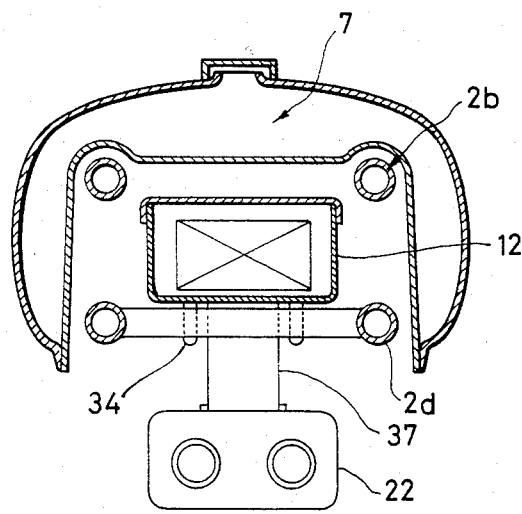
FIG. 4 is a cross sectional view taken along lines IV—IV of FIG. 3.

The fuel tank 7 which is carried on the pair of right and left upper main pipes 2b is supported at the rearward end thereof in such a way as to be able to rotate with respect to the body of the motorcycle by means of the support members 7d, 24. An auxiliary tank 31 is mounted to this fuel tank 7 via a flexible tube 30. As shown in FIGS. 3 and 4, the configuration of the cross section of the fuel tank 7 is concaved in such a way as to cover the upper and lower members 2b, 2d, thereby contributing to an increase in the fuel capacity.

FIG. 5 is a side view showing in cross section the portion of the air cleaner in FIG. 3. FIG. 6 is a plan view thereof which is shown partially in cross section. A pair of cross-pipes 32, 33 are mounted on the pair of right and left lower main pipes 2d with a predetermined distance therebetween. The cross-pipe 32 is provided with a recess formed in the uppr surface in the longitudinal direction thereof. The air cleaner 12 utilizes the pair of cross-pipes 32, 33 as mounting stays. There are provided a pair of hook members 34, 35 which engage the cross-pipe 32 at the bottom portion thereof for mounting. In addition, there is provided a fixing portion 36 which is fixed to the cross-pipe 33 by a screw or the like.

The intake pipe 17 of the air cleaner 12 is positioned at the back of the head pipe 3 and is bent as shown in the drawing in a way such that its suction port is directed downwardly. In the vicinity of the inlet of the air cleaner 12, there is provided a rectifying member 18, for example, which is of substantially of V-shape configuration when viewed in the axial direction and which forms a pair of inclined surfaces in a way such as to become distant from one other towards the filter element 16. With the rectifying member 18, the air introduced by way of the intake pipe 17 branches substantially uniformly to effectively utilize the whole of the elliptical element 16 (filter paper). The air input by way of the element 16 is supplied to the above mentioned resonance chamber 22 by way of a cone tube 37 extending from the outlet of the air cleaner 12.

Figure 7:
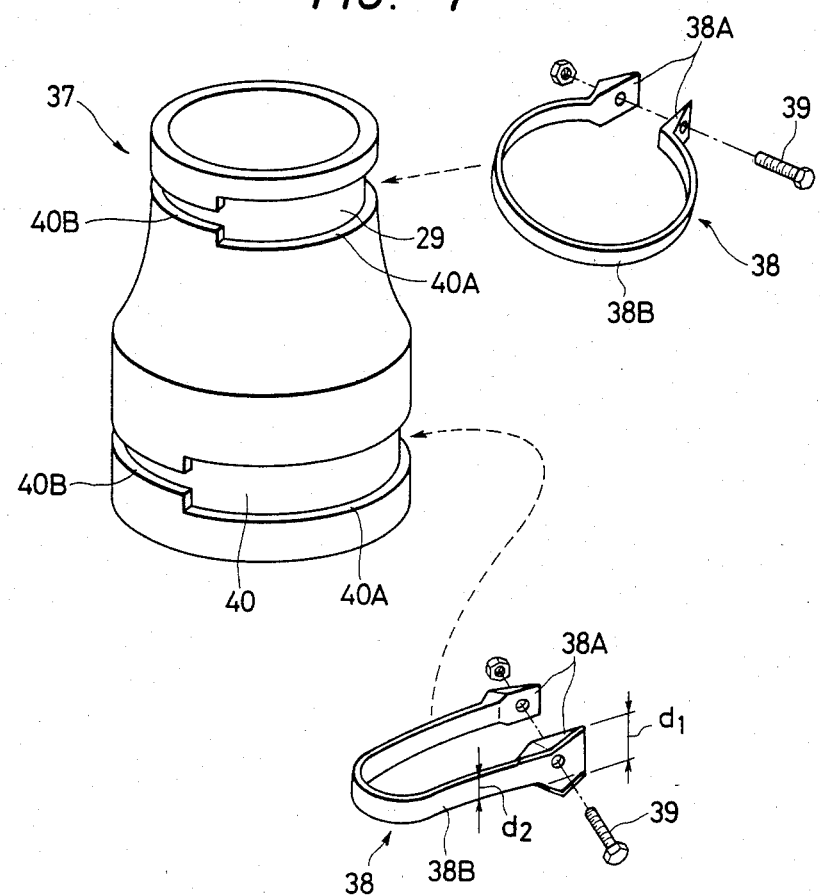
FIG. 7 is a perspective view showing the cone tube of FIG. 5.

As shown in the perspective view of FIG. 7, the cone tube 37 is substantially a truncated cone. Both ends thereof are fitted to the air cleaner 12 and the resonance chamber 22 (expansion chamber) respectively, and are fastened and fixed to the respective parts by means of connecting bands 38 and screws 39 so that they may not be detached from one another. There are formed grooves 40 at both ends of the cone tube 37 in order to dictate the fastening positions of the connecting bands 38. Each of the guide grooves 40 is composed of a portion 40A, the width of which is substantially equal to or larger than the width ($d_1$) of the fastening portion 38A of the connecting band 38 and a portion 40B the width of which is substantially equal to the width ($d_2$) of the band portion 38B so that fastening by means of the connecting bands 38 is effected in a state in which the center axis of the connecting band 38 is always in alignment with the axis of the cone tube 37.

Figure 8:
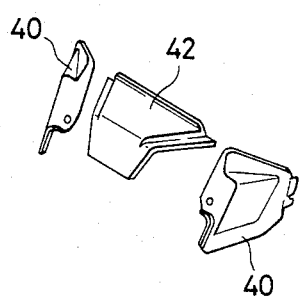
FIG. 8 is a perspective view showing a pair of side covers and a rainwater protector used in the present invention.

FIG. 8 shows a side cover and a protector against the entry of rainwater used in the present invention. As clearly understood from FIGS. 1 or 5, since the front portion of the air cleaner 12 is not covered by a wall surface of the fuel tank 7, it is exposed to the outside. Thus, the side surface in the front of the air cleaner 12 is covered with the side cover 40 and the upper surface in front of the air cleaner 12 is covered with the protector 42, thereby making it possible for the front portion of the air cleaner 12 to be protected thereby.

Figure 9:
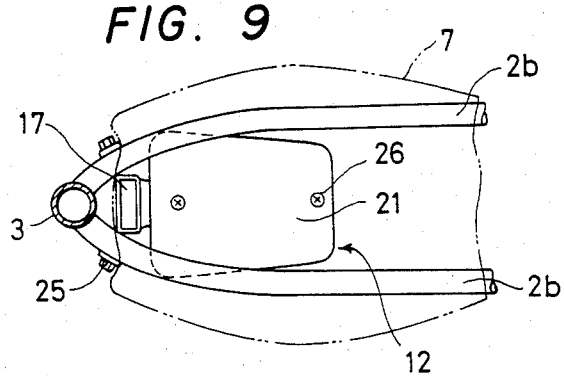
FIG. 9 is a plan view of a portion of the air cleaner in accordance with the second embodiment of this invention.
Figure 10:
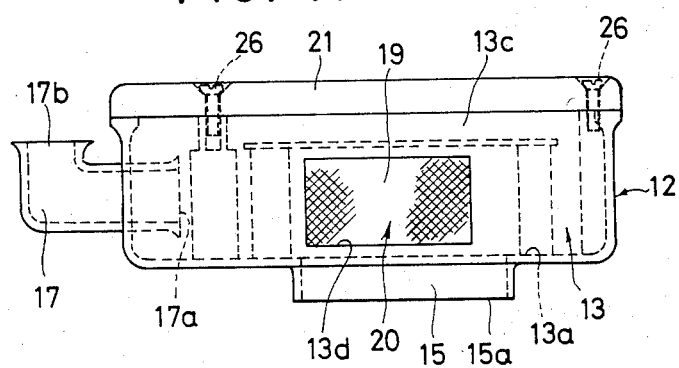
FIG. 10 is an enlarged side elevation showing the air cleaner in accordance with the second embodiment.
Figure 11:
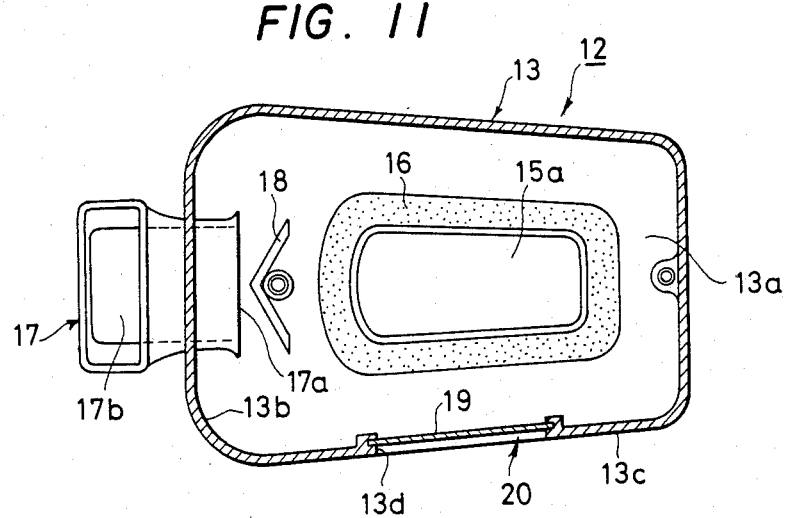
FIG. 11 is a plan view in cross section showing the device of FIG. 10 with the cover taken away.

FIGS. 9-11 show other embodiments of the air cleaner in accordance with the present invention. In the same manner as in the first embodiment, the air cleaner 12 is arranged between the pair of right and left upper members 2b and the pair of right and left lower members 2d. The air cleaner 12 is arranged in a dead space between the right and left members and between the upper and lower members 2b, 2d. Therefore, it becomes possible to effectively use the dead space. The air cleaner 12 may be of a type in which the front portion is wide and the rear portion is narrow. The air cleaner 12 is composed of a case proper 13 and a cover 21 which detachably covers the upper portion of the case 13. There is provided an opening 15a with a rib 15 projected downwardly at the central part of the bottom 13a of the case 13. The periphery of the opening 15a is surrounded by a filter element 16 which is loop like and which has a certain height. The detachable element 16 may also have a shape such that the front portion is wide and the rear portion is narrow. The base portion of the intake pipe 17, of which the side surface is substantially L-shaped, is inserted into the front wall 13b of the case 13 so as to be fixed thereto. In this embodiment, there is provided a branching plate 18 at a position short of the element 16 and just after the outlet 17a of the intake pipe 17 so that the air which is sucked into the case 13 from the intake pipe 17 branches to the right and left and is sent rearwardly. The air intake port 17b of the intake pipe 17 is opened upwardly in front of the front wall 13b and is positioned in the space (S). There is formed a square opening 13d in one side wall 13c of the case 13. The opening 13d is covered with a transparent member 19 so as to form a viewing window 20 at one side. The upper part of the above mentioned case 13 is detachably covered with cover 21 which is fixed thereto by means of screws 26. The cover 21 is removable so as to replace the element 16 with another one. A rib 15 which is provided at the central portion of the bottom plate 13a of the case 13 in a way such as to project downwardly therefrom is connected to the resonance chamber 22, which is connected to the carburetor 23 of the engine 6. Hence, air which is introduced by way of the intake pipe 17 is guided to the dirty side of the case 13 outside the element 16. The cleaned air is introduced to the carburetor by way of the element 16.

It is possible to recognize if the element in the air cleaner 12 has become dirty through the viewing window 20 provided on one side. However, the fuel tank 7 is usually lowered as shown in FIG. 1 and covers the air cleaner with its side portions 7a so that it is not exposed to the exterior. When it is desired to check the element 16, the tank 7 is lifted as shown in FIG. 2 so that the upper members 2b and the lower members 2d are exposed and the side portion of the air cleaner 12 which is arranged between the two is exposed along with the viewing window 20. Thus, it is possible to check the element 16 through the window by merely lifting the tank 7 to the height of the upper member 2b. That is, it is possible to check if the element has become dirty without removing the cover 21 of the air cleaner 12. Thus, this operation becomes very simple. In addition, the air cleaner 12 is arranged effectively utilizing the narrow space between the frame members. The troublesome operation of detaching and mounting the cover is not necessary.

In accordance with the present invention as explained in detail above, there is arranged an air cleaner in a space portion surrounded by a head pipe, a pair of right and left upper main pipes and a pair of right and left lower main pipes. Thus, this space portion which was a dead space in accordance with the prior art is effectively utilized. As a result, the slimness of the body of the motorcycle is not sacrificed. In addition, only one air cleaner is required, and thus, it becomes possible to lower the cost and the assembly operation is improved. Furthermore, since the air cleaner is surrounded by the frame pipes and thus protected, it becomes possible to use a material such as synthetic resin or iron plate of low strength, and the weight of the motorcycle is lightened and the cost thereof is lowered.

On the other hand, since the pair of cross-pipes which are mounted on the main pipes are utilized as the stays for mounting, the number of parts decreases and the cost can be lowered. In addition, since it is sufficient if only the hook member which is provided on the air cleaner is engaged with one of the pair of pipes and the cleaner is fastened and fixed at only one point at the rear portion, the mounting thereof becomes very simple and the work in assembly is decreased.

Furthermore, since there is provided a rectifying member between the suction port of the air cleaner and the element, the intake air branches almost uniformly. As a result, it becomes possible to prevent the air resistance from being increased by the uneven adhesion of dust on the element.

In addition, the suction port of the air cleaner is provided so as to be directed towards the head pipe side and downwards in accordance with the first embodiment. Since there are a head pipe, a bottom-bridge, a horn, the bottom-bridge cover and the like in front of the suction port, they become a guard against water when the motorcycle travels in the rain. Also, there is no influence due to dynamic pressure differentials when the motorcycle travels. Furthermore, the intake air temperature is lowered due to the distance from the engine.

It becomes possible to easily confirm if the element has become dirty through the viewing window from the exterior by merely lifting the fuel tank and without removing the cover of the air cleaner. This is very advantageous with respect to maintenance. In addition, the above can be realized in a simple construction by providing a transparent portion in at least one portion of the case proper or the cover.

Although there is provided an aircleaner below the fuel tank in accordance with the above mentioned embodiment, it is also acceptable to construct it in such a way that the seat is lifted for inspection. In addition, the invention is not limited to a motorcycle but is likewise applicable to other vehicles.

While the invention has been described in detail and with reference to specific embodiments thereof, it will be apparent to one skilled in the art that various changes and modifications can be made therein without departing from the spirit and scope of the invention.

What is claimed is:

1. In a motorcycle having an engine, a frame, a fuel tank, and an air cleaner, the improvement comprising; said air cleaner positioned below a bottom wall of, and at a front portion of said fuel tank; and said frame provided with a head pipe, at least one upper main pipe extending in the vicinity of said bottom wall of said fuel tank and connected to said head pipe, and a pair of lower main pipes positioned above said engine and connected to said upper pipe adjacent to a rear half portion of said fuel tank, said air cleaner being disposed within a space defined by said head pipe, said upper main pipe and said pair of lower main pipes.

2. The improvement of claim 1, said air cleaner including water protector means at a front end thereof.

3. The improvement of claim 1, further comprising a pair of cross-pipes, each extending between said lower main pipes, at least one hook member connected to said air cleaner and engageable with one of said cross-pipes; a fixing portion connected to said air cleaner and connectible to the the other of said cross-pipes.

4. The improvement of claims 1 or 3, wherein said air cleaner includes an air intake pipe and a filter element, and further comprising a rectifying member disposed between said intake pipe and said filter element.

5. The improvement of claim 4, wherein said filter element is of elliptical shape.

6. The improvement of claim 4, wherein said rectifying member has a V-shaped configuration widening in the direction of air flow.

7. The improvement of claim 4, wherein said intake pipe is positioned adjacent to said head pipe, and wherein an open end of said intake pipe is oriented downwardly.

8. The improvement of claim 1, further comprising a cone tube positioned vertically between said air cleaner and a chamber positioned at an upstream side of a carburetor.

9. The improvement of claim 1, further including window means in a housing of said air cleaner for viewing a cleaning element thereof.

10. The improvement of claim 1, said air cleaner being disposed between downwardly projecting portions of said fuel tank.

11. The improvement of claim 10, said fuel tank being pivotally mounted to expose said air cleaner, and window means in said air cleaner for exposing a cleaning element thereof when said fuel tank is pivoted.

* * * * *